C. SIMON.
VEHICLE FRAME SUSPENSION AND SHOCK ABSORBER.
APPLICATION FILED DEC. 29, 1914.
1,163,476.
Patented Dec. 7, 1915.
2 SHEETS—SHEET 1.
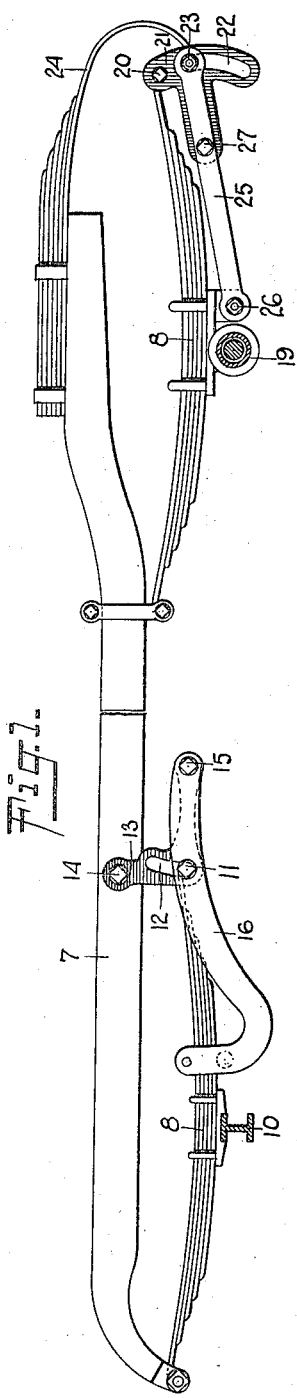
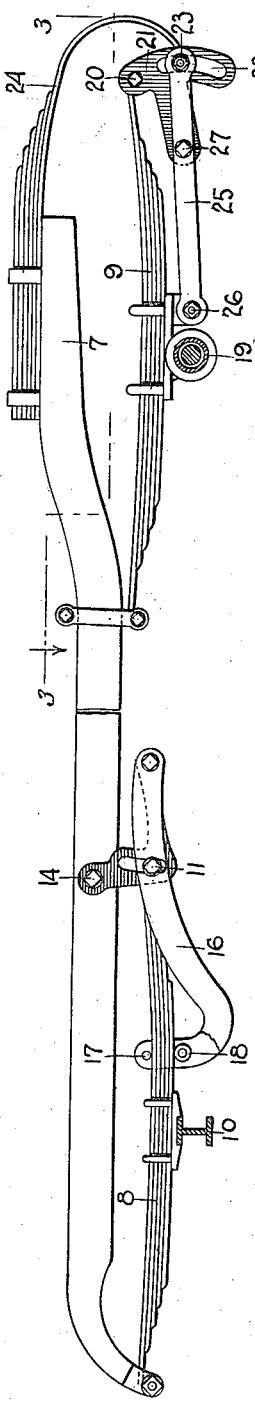
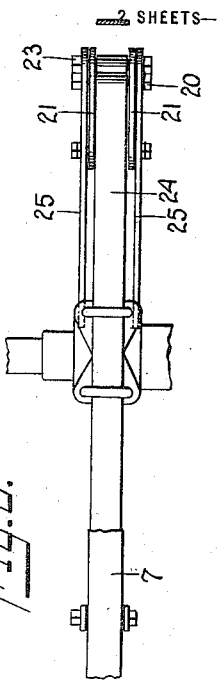
WITNESSES
INVENTOR
Charles Simon
BY
ATTORNEYS

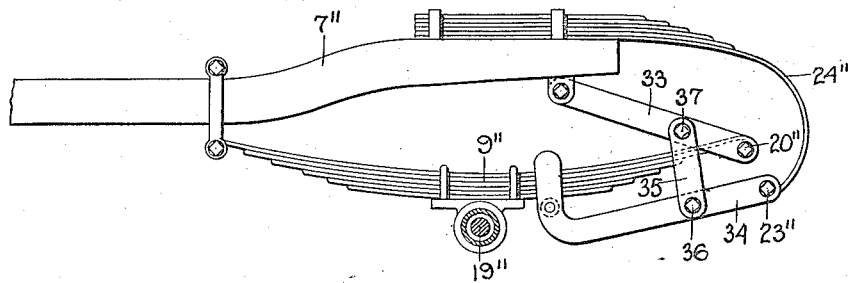
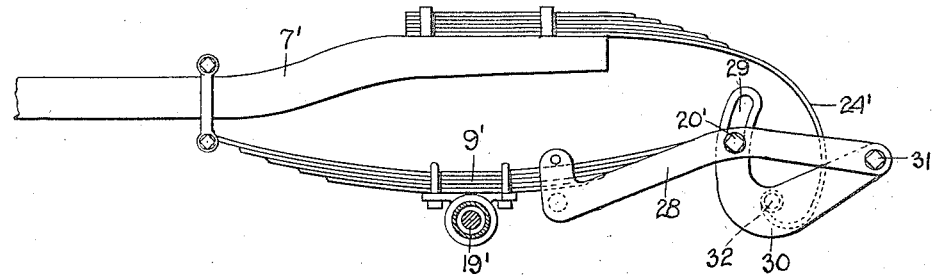
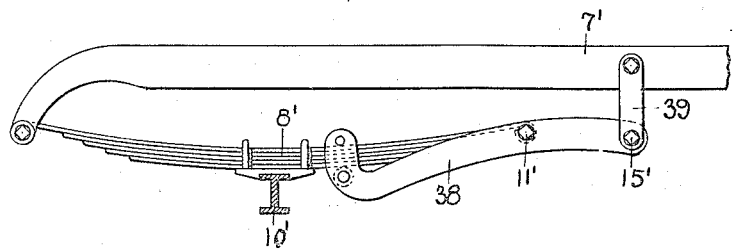

UNITED STATES PATENT OFFICE.

CHARLES SIMON, OF NEWARK, NEW JERSEY.

VEHICLE FRAME SUSPENSION AND SHOCK-ABSORBER.

1,163,476. Specification of Letters Patent. Patented Dec. 7, 1915.

Application filed December 29, 1914. Serial No. 879,485.

*To all whom it may concern:*

Be it known that I, CHARLES SIMON, a citizen of the United States, and a resident of Newark, in the county of Essex and State of New Jersey, have invented a new and Improved Vehicle Frame Suspension and Shock-Absorber, of which the following is a full, clear, and exact description.

My invention relates to vehicle-frame suspensions and has reference more particularly to means associated with the elliptical spring of the vehicle to serve as a shock absorber for the vehicle.

The invention is characterized by the provision of interpivoted levers positioned intermediate one end of the elliptical spring and the frame, the interpivoted levers permitting to the said end of the spring a free limited movement relative to the frame of the vehicle.

An object of the invention is to provide a simple, strong, efficient and inexpensive frame suspension which can be as easily applied to newly constructed motor vehicles as to motor vehicles already in use, as the attachment proper is applicable directly between one end of the spring and the frame of the vehicle without any alteration to any part of the vehicle.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a side elevation of a vehicle frame provided with an embodiment of my invention; Fig. 2 shows the displacement of the spring and levers associated therewith under a sudden shock or jolt; Fig. 3 is a section on line 3—3, Fig. 2; Fig. 4 is a modified structure of the frame-suspension in the rear of the vehicle; Fig. 5 is a further modified structure thereof; Fig. 6 is a modified structure of the suspension of the front of the frame of the vehicle.

Referring to the drawings, 7 represents the chassis or frame of the vehicle body which is provided with front and rear elliptical springs 8 and 9 respectively. Each of the front springs 8 has one end thereof pivotally connected to the front end of the chassis, with its central part on the front running-gear axle 10. The other end of the springs 8 carry a pin 11, each end of which pin projects through a slot 12 provided in a bell-crank-shaped arm 13 attached at one end thereof by a bolt 14 to the chassis 7. The pair of arms 13 for each spring 8 has the other end of the arms lying outside of the spring and connected by a spacer 15. This spacer 15 forms a pivot for one end of levers 16 which are substantially unyielding, the other end of said levers 16 projecting above the elliptical spring 8 adjacent the bearing thereof on the axle 10. The levers 16 also engage the pin 11 carried by the spring end 8. The ends of the levers 16 at the spring are connected by a pin 17 located on the upper surface of the elliptical spring. They also carry a roller 18 in contact with the lower surface of the elliptical spring. This pin and roller tie the said end of the lever 16 to the spring adjacent its bearing. The slot 12 in each of the arms 13 is arcuated and has for its center the axis of the spacer 15 which forms the fulcrum of the lever 16, as will be pointed out hereinafter.

Each of the rear springs 9 has one end thereof pivotally connected to the chassis 7, while the middle thereof bears on the rear running-gear axle 19. The other end of the said spring 9 has a pin 20 the ends of which are carried by a pair of arms 21, each of which arms has a slot 22 engaged by a pin 23 carried by the end of a spring 24 connected to the rear of the chassis 7. Each end of the pin 23 engages one end of a substantially unyieldable lever 25, the other end of which lever is pivotally connected by a bolt 26 to the spring 9 adjacent the rear axle 19. Each pair of arms 21 is pivotally connected to the levers 25 by a bolt 27; and the axis of said bolt 27 is the center of curvature of the slot 22 in which the pin 23 is mounted to slide. The bolt 27 is the floating fulcrum of the levers 25, while the spacer 15 is the floating fulcrum for the levers 16 for the front spring.

When the wheels of the rear axle 19 meet an obstacle, the chassis and axle will move toward each other, causing a parting between the pin 20 of the rear spring and the pin 23 engaged in the slot. The increase in distance between the two pins will be proportionate to the shock received, the bolt 27 constituting a fulcrum for the levers 25 as the end connected to the spring at the axle 19 moves toward the chassis and the end of the lever connected to the pin 23 moves with the chassis. The displacement under the load is shown in Fig. 2. The length of the slots 22 in the arms 21 is such that when the pin 23 reaches the end of the slot the bumper provided on the axle will contact with the chassis. It may be remarked that the bolt 27 which forms the fulcrum of the levers 25 floats as the distance between the pins 20 and 23 is varied.

When the front wheels of the vehicle meet an obstacle the front axle and chassis will move toward one another; consequently, while the arms 13 move toward the end of the spring the ends of the spring with the end of levers 16 connected to the spring at the axle will move toward the chassis. That is to say, the levers 16 will fulcrum on the spacer 15 and, consequently, the pin 11 will move with the spring in the slot toward the chassis (see Fig. 2). In the front, as in the rear springs, one end thereof has a free movement relative to the chassis limited only by the slots 12 in the front and the slots 22 in the rear of the chassis.

In Fig. 4 a modified structure of the rear suspension of the frame is shown. In this case substantially unyieldable levers 28 are attached to the rear springs 9', similar to the levers 16 shown in the front suspension in Fig. 1. The pin 20' which is carried by the levers 28 passes through slots 29 provided in bell-crank arms 30; the other end of arms 30 is pivotally connected to the end of the levers 28 by a spacer 31 forming the floating fulcrum for the levers 28. The spring 24' is connected to the bell-crank arms by a pin 32 at any suitable place, preferably near the elbow. It will be noted that in this case when the rear axle 19' moves toward the chassis 7' under some cause the ends of the levers 28 attached to the spring will move therewith on the fulcrum 31, while the bell-crank arms will tend to turn on the fulcrum; thus the pin 20' of the spring will move in the slot and the two pins 20' and 32 will part proportionately to the relative movement of the chassis and the axle 19'. Again, the pin 20' will move in an arc, the center of which is the axis of the spacer 31.

In Fig. 5 the spring 9" has its pin 20" connected to the chassis by levers 33, while the spring 24" has its end connected to one end of arms 34, the other end of which arms engages the elliptical spring 9" adjacent its bearing on the rear axle 19". The levers 33 and 34 are substantially unyieldable and are interconnected by links 35 engaging the bolt 36 connecting the links 35 in which the bolt 36 connecting the links 35 to the levers 34 is the floating fulcrum for said levers 34, while the bolt 37 connecting said links 35 to the levers 33 is the floating fulcrum for the levers 33; and when the rear axle 19" and the chassis 7" are caused to move toward one another the pin 20" and the pin 23" are caused to part proportionately to the approaching movement of the rear axle to the chassis.

In Fig. 6 a modified suspension of the front spring is shown. The pin 11' is attached to levers 38 intermediate the ends of said levers. Said levers at one end are engaged with the spring 8' adjacent its bearing on the front axle 10'. At the other end they are pivotally connected by spacers 15' to links 39 which are in turn pivotally connected to the chassis 7'. As the front axle 10', and the chassis 7' are by some cause moved toward one another, the spacer 15', with the ends of the levers 38 attached thereto, will move with the chassis, while the other end of the levers 38 will move with the axle 10' toward the chassis. Thus, the pin 11' will move toward the chassis, and its movement will be proportionate to the relative displacement of the chassis and front axle and limited by the distance of said pin 11' from the bottom of the chassis or by the engagement of the chassis with the bumper provided on the axle.

The details of the structure disclosed in Fig. 6 forms the subject matter of a different application, although the said structure is broadly covered in the present application.

From the above description it will be seen that each of the front and rear springs of the suspension has an end having a limited free movement relative to the chassis, this limited free movement of the spring being controlled by pivotally connected substantially unyieldable levers interposed between said end of the chassis. In place of the spring 24 a rigid connection can be made from the chassis to the pin 23.

The advantage of the construction and operation of the suspension will be readily understood by those skilled in the art, to which the invention pertains; and while I have described the principle of operation, together with the device, which I now consider to be the best embodiment thereof, I desire to have it understood that the construction shown is merely illustrative and that such changes may be made as are within the scope of the appended claims.

Having thus described my invention, I claim as new and desire to secure by Letters Patent:

1. In a shock absorber for vehicles, a slotted arm, a lever pivotally connected to the arm, means on the lever engaging the slot of the arm, said arm and lever having means for securing the lever and arm to the spring and frame of the vehicle so that the pivotal connection of the lever and arm is exterior of the spring.

2. In combination with a vehicle frame and running gear, elliptical springs each having one end thereof in pivotal engagement with the frame and bearing on the running gear between its ends, and a pair of pivotally connected and interengaging levers between the other end of each spring and the frame, the pivotal connection of said levers forming a floating fulcrum, one of said levers engaging the spring adjacent its bearing on the gear.

3. In combination with a vehicle frame and running gear, elliptical springs each having one end thereof in pivotal engagement with the frame and bearing on the running gear between its ends, a pair of pivotally connected and interengaging levers for the other end of each spring, one of said levers being pivotally connected to said end of the springs, the other of said levers being pivotally connected to the frame, and means connecting one of said levers to the spring adjacent its bearing on the running gear.

4. In combination with a vehicle frame and a running gear, elliptical springs each having one end in pivotal engagement with the frame and bearing on the running gear between its ends, a slotted arm associated with the other end of the spring and the frame, and a substantially unyieldable lever pivotally connected to the said arm and engaging the spring at its bearing on the running gear, said lever having means engaging the slot of the arm.

5. In combination with a vehicle frame and running gear, an elliptical spring pivotally engaging the frame at one end and bearing on the running gear intermediate its ends, an arm pivotally connected to the other end of the spring, a substantially unyieldable lever in pivotal connection with the said arm and said spring adjacent the bearing of the spring, said arm having a slot, said lever having means engaged in the slot, said means being connected to the frame.

6. In combination with a vehicle frame and running gear, an elliptical spring pivotally engaging the frame at one end and bearing on the running gear intermediate its ends, a slotted arm pivotally connected to the other end of said spring, a substantially unyieldable lever pivotally connected to said arm and having means at one end thereof engaging the slot of the arm, the other end of said lever being connected to the spring at its bearing, and means connecting the frame to the end of the lever engaged in the slot.

7. In combination with a vehicle frame and running gear, an elliptical spring pivotally engaging the frame at one end and bearing on the running gear intermediate its end, a slotted arm pivotally secured to the other end of the spring, a substantially unyieldable lever in pivotal connection with said arm having one end thereof engaging the slot, the other end of said lever being pivotally connected to the spring adjacent its bearing, and a resilient member connecting the frame to the end of the lever engaging the slot.

8. In combination with a vehicle frame and running gear, an elliptical spring pivotally engaging the frame at one end and bearing on the running gear intermediate its ends, a T-shaped arm pivotally connected to the other end of said spring with one of its shoulders, said T-shaped end having a slot extending from the other end of the shoulder toward the pivoted shoulder, a lever pivotally connected to said T-shaped arm at the base thereof, one end of said lever being pivotally connected to the spring at its bearing, a pin in the other end of said lever engaging the slot, the slot in the arm being arcuated and having for its center the axis of the pivotal connection between the lever and the arm, and a resilient member from the frame to the pin.

9. In combination with a vehicle frame and running gear, elliptical springs each having one end thereof in pivotal engagement with the frame and bearing on the running gear between its ends, a slotted arm connecting the other end of the spring with the frame, and a lever in pivotal engagement with said arm and said spring adjacent its bearing, said lever having means engaging the slot of the arm, said slot being arcuated and having for its center of curvature the axis of the pivotal connection between the arm and the lever.

10. In combination with a vehicle frame and running gear, an elliptical spring pivotally engaging the frame at one end and bearing on the running gear intermediate its ends, a slotted arm associated with the other end of the spring, a substantially unyieldable lever in pivotal connection with the arm and engaging the spring adjacent its bearing, said arm having a pin engaging the slot, and resilient means connecting the frame to the pin, the pivotal connection of the arm and lever forming a floating fulcrum on which the lever and arm move when the running gear and frame move toward one another.

11. In combination with a vehicle frame and running gear, elliptical springs each having one end thereof in pivotal engagement with the frame and bearing on the running gear between its ends, and a pair of pivotally connected levers between the other end of each spring and the frame, the pivotal connection of said levers being exterior to the spring, one of said levers being connected to the spring at its bearing.

12. In combination with a vehicle frame and running gear, elliptical springs each having one end thereof in pivotal engagement with the frame and bearing on the running gear between its ends, and a pair of pivotally connected levers between the other end of each spring and the frame, one of said levers engaging the spring adjacent its bearing on the gear, said lever not being connected directly to the frame.

13. In combination with a vehicle frame and running gear, elliptical springs each having one end thereof in pivotal engagement with the frame and bearing on the running gear between its ends, and a pair of pivotally connected levers between the other end of each spring and the frame, the pivotal connection of said levers being exterior of the spring to form a floating fulcrum on which said levers turn, one of said levers engaging the spring adjacent its bearing on the gear, said lever not being connected directly to the frame.

In testimony whereof I have signed my name to this specification in the presence of two subscribing witnesses.

CHARLES SIMON.

Witnesses:
  B. JOFFE,
  PHILIP D. ROLLHAUS.